(12) United States Patent
Li et al.

(10) Patent No.: US 8,526,318 B2
(45) Date of Patent: Sep. 3, 2013

(54) METHOD AND DEVICE OF IDENTIFYING THE PAYLOAD OF A DATA PACKET IN A TCP STREAM

(75) Inventors: Li Li, Beijing (CN); Jia Jia Wen, Beijing (CN); Zhe Xiang, Beijing (CN); Yi Xin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 12/869,828

(22) Filed: Aug. 27, 2010

(65) Prior Publication Data

US 2011/0051614 A1      Mar. 3, 2011

(30) Foreign Application Priority Data

Aug. 28, 2009   (CN) .......................... 2009 1 0168622

(51) Int. Cl.
*H04L 12/26*   (2006.01)

(52) U.S. Cl.
USPC .............................. 370/252; 713/176; 726/23

(58) Field of Classification Search
None
See application file for complete search history.

(56) References Cited

U.S. PATENT DOCUMENTS

| 6,728,929 | B1 * | 4/2004 | Luong ............................ 714/807 |
| 7,328,349 | B2 * | 2/2008 | Milliken ....................... 713/181 |
| 7,363,278 | B2 | 4/2008 | Schmelzer et al. |
| 7,451,489 | B2 * | 11/2008 | Cantrell et al. ................. 726/25 |
| 7,515,612 | B1 * | 4/2009 | Thompson .................... 370/474 |
| 7,703,138 | B2 * | 4/2010 | Desai et al. .................... 726/23 |
| 7,856,661 | B1 * | 12/2010 | Sebes et al. .................... 726/22 |
| 8,094,607 | B2 * | 1/2012 | Arye et al. ..................... 370/326 |
| 2002/0071438 | A1 * | 6/2002 | Singh ............................ 370/398 |
| 2003/0204632 | A1 * | 10/2003 | Willebeek-LeMair et al. .............................. 709/249 |
| 2006/0114939 | A1 * | 6/2006 | Singh ............................ 370/469 |
| 2006/0168318 | A1 * | 7/2006 | Twiss ............................ 709/238 |
| 2006/0184961 | A1 | 8/2006 | Lee et al. |
| 2008/0163288 | A1 | 7/2008 | Ghosal et al. |

FOREIGN PATENT DOCUMENTS

CN          101505218 A      8/2009

OTHER PUBLICATIONS

Wikipedia, "Deep Packet Inspection" en.wikipedia.org/wiki/Deep_packet_inspection.
Chinese Office Action; 200910168622.4; Dec. 12, 2012; pp. 1-6.
Y. Wu et al., "Content-aware Authentication of Motion JPEG2000 Stream in Lossy Networks," IEEE Trans. on Consumer Electronics, vol. 49, No. 4, Nov. 2003.
Y. Choi, "On the Accuracy of Signature-based Traffic Identification Technique in IP Networks," IEEE Broadband Convergence Networks, BcN '07, pp. 1-12, May 2007.
T. Mennecke, "Largest Thai ISP Caches P2P Traffic," Slyck News, www.slyck.com/story1185_largest_thai_isp_cahes_p2p_traffic, May 13, 2006.

(Continued)

*Primary Examiner* — Donald Mills
(74) *Attorney, Agent, or Firm* — Cantor Colburn LLP; Dwayne Nelson

(57) ABSTRACT

A method and device of identifying payload of a data packet in a TCP stream. The method includes the steps of: calculating a payload signature according to information in header of the data packet in the TCP stream; comparing the payload signature with a pre-stored file signature; determining the payload of the data packet in the TCP stream as belonging to a file corresponding to the pre-stored file signature, in response to a match between payload signatures of multiple data packets and the pre-stored file signature. The present invention can monitor and identify TCP streams by using a more efficient and lower cost solution.

7 Claims, 10 Drawing Sheets

(56) References Cited

OTHER PUBLICATIONS

Figure 1:
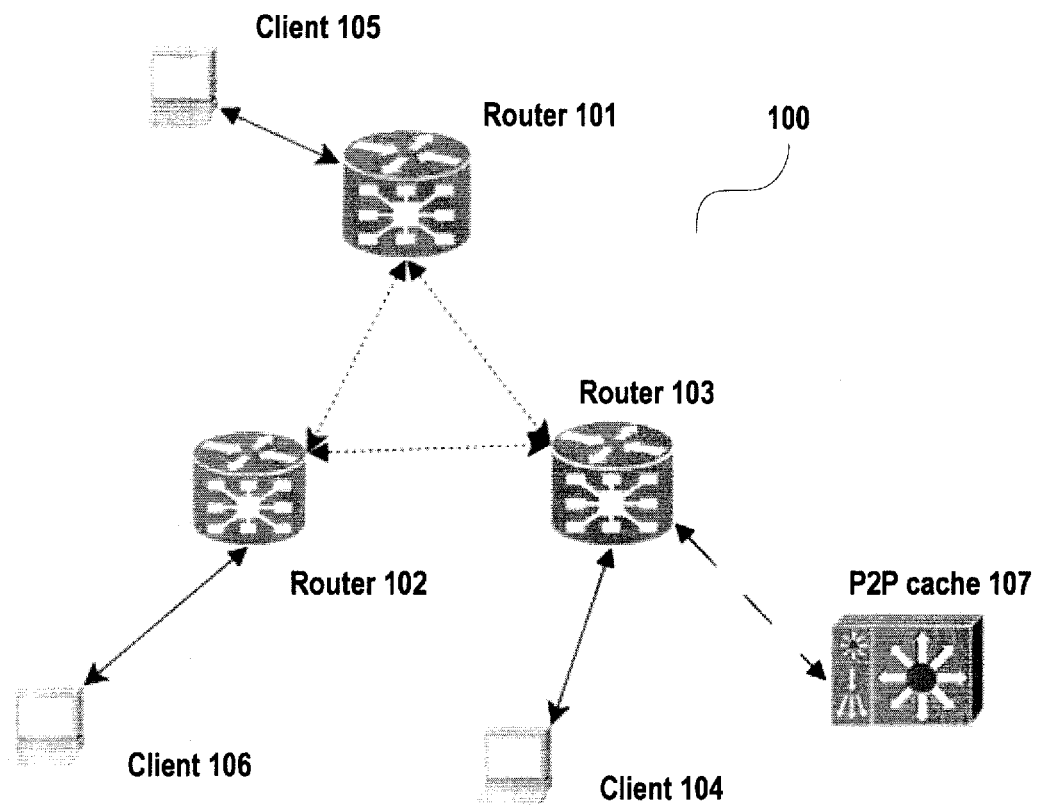

Wikipedia, "Deep Packet Inspection" en.wikipedia.org/wiki/Deep_packet_inspection, Aug. 9, 2010.

Y. Kulbak et al., "The eMule Protocol Specification," The Hebrew University of Jerusalem, Jan. 17, 2005.

Wiki Theory, "The BitTorrent Specification," wiki.theory.org/BitTorrentSpecification, 2006.

\* cited by examiner

METHOD AND DEVICE OF IDENTIFYING THE PAYLOAD OF A DATA PACKET IN A TCP STREAM

CROSS-REFERENCE TO RELATED APPLICATION

This application claims priority under 35 U.S.C. §119 from Chinese Patent Application No. 00910168622.4 filed Aug. 28, 2009, the entire contents of which are incorporated by reference herein.

BACKGROUND OF THE INVENTION

1. Field of the Invention

The present invention relates to the transmission of network data. More specifically, the present invention relates to a method and device of identifying the payload of a data packet in a TCP stream.

2. Description of the Related Art

P2P (Peer-to-Peer) traffic is growing dramatically in recent years. According to a study report by CacheLogic in 2006, up to 70% of ISP (Internet Service Provider) traffic was P2P traffic.

In brief, P2P is technology for exchanging data or services directly between different computer users without a relay device, which allows an Internet user to utilize files of the other party. Each person may be directly connected to a computer of another user for a file exchange without being connected to a server for browsing and downloading. In a P2P operating mode, each client terminal acts as both a client and a server. This leads to a "flat" network model.

A P2P computer network uses diverse connectivity between participants in a network, and it leverages the cumulative bandwidth of network participants rather than conventional centralized resources, where a relatively low number of servers provide the core content to a service or application. P2P networks are typically used for connecting nodes via ad hoc mode. Such networks are quite useful for many applications. Common examples of such applications include sharing files containing audio, video, data or any content in digital format, and transferring real-time data, such as telephony media. In addition, P2P demonstrates its uses in deep search, distributed computing, cooperative work, and other aspects.

While P2P users are enjoying convenient services, ISPs are suffering from the pains with P2P. For ISPs, P2P technology has the following major problems.

First, the extensive use of P2P in terms of requirement of the bandwidth to network operator, such as high backbone transit tolls, and network congestion caused by a huge P2P traffic load during peak hours. In order to ensure transmission quality, most P2P tools will create a large amount of connections, whereas no data is transmitted over these connections. Hence, this consumes precious network resources to no purpose. Furthermore, because P2P traffic exerts a dramatic impact on telecommunication-level service of carrier networks such as NGN (Next Generation Network) and 3G ($3^{rd}$ Generation), the quality of network service is degraded, and telecommunication-level service is no longer secured.

Second, the permeation of enormous P2P applications at networks also puts network security at risk, such as the propagation of malicious software by using P2P application, and leakage of sensitive information.

Third, the extensive use of P2P means potential exposure to litigation, such as intellectual property disputes.

In view of the foregoing drawbacks, operators are compelled to manage and control P2P service.

The "traffic limiting+connection limiting" technique, the most management and control technique, is to limit the bandwidth and the number of connections. A result from limiting the bandwidth is a decrease in users' P2P download speed, and a result from limiting the number of connections is a decrease in the number of P2P connection users. Apparently both of them fulfill the purpose of limiting P2P traffic.

It is however impossible to fully solve the problem simply by blocking P2P, and a more reasonable and effective measure is to guide P2P service to reasonable use. Hence, the P2P cache technique emerges as the circumstance demands.

Largest That ISP Caches P2P Traffic (http://www.slyck.com/story1185_largest_thai_isp_caches_p2p_traffic), released by Thomas Mennecke on May 13, 2006, describes P2P caching in detail, the disclosure of which is incorporated by reference.

P2P caching enables ISPs to better bear P2P service on their networks by effectively managing the peaks and valleys associated with P2P usage. P2P caching frees up the network bandwidth, reducing the need for ISPs to purchase more bandwidth to meet increasing demands and reducing the need to limit P2P usage through byte caps, policies or traffic shaping. Therefore, P2P caching provides an improved experience for all users. Specifically, P2P users improve their file sharing by using P2P caching, and non-P2P users experience better network performance by being liberated from congestion caused by P2P traffic.

It is estimated that 4 out of 5 files requested via P2P can be served by P2P caching. This ratio is significantly higher than HTTP/Web caching. Hence, the utilization efficiency of P2P caching is also much higher than that of HTTP/Web caching, and in turn, the establishment of P2P caching can produce more incomes than that of HTTP/Web caching.

P2P caching involves creating a cache or temporary storage space for P2P data by using specialized communications hardware, disk storage and associated software. The created cache is placed in the ISP's network, either co-located with the Internet transit links or placed at key aggregation points or at each cable head-end.

FIG. 1 is a schematic block diagram of a P2P caching system in the prior art. The P2P caching system 100 shown in FIG. 1 employs existing inspection techniques such as DPI (Deep_Packet_Inspection), and routers 101-103, clients 104-106, and a P2P cache 107 are all known in the prior art.

Take clients 104 and 105 for example. As described above, client 104 may be directly connected to client 105 for a file exchange where P2P cache 107 is not established.

Once P2P cache 107 is established, the network will transparently direct P2P traffic to P2P cache 107. P2P cache 107 either provides file services to client 104 directly or passes the request on to a remote P2P user (for example, client 105) and simultaneously caches that data for the next user (for example, client 106).

As described above, P2P cache 107 usually works in conjunction with the network traffic inspection and control technique called DPI. ISPs utilize DPI to learn what traffic is running across their networks, separate and treat the traffic for the most efficient delivery.

DPI technology is based on traffic inspection and control at the application layer. When an IP (Internet Protocol) data packet, a TCP (Transmission Control Protocol) or UDP (User Datagram Protocol) data stream flows through a DPI-based bandwidth management system, the system reorganizes application layer information in the OSI (Open System Interconnection) 7-Layer Protocol by deep-reading content of IP packet payload, obtains content of the entire file and thus shapes traffic according to a management policy defined in the system. The web page http://en.wikipedia.org/wiki/ Deep_packet_inspection provides a detailed description of DPI, the disclosure of which is incorporated here by reference.

As DPI needs to deep-read content of IP packet payload and obtain content of the entire file, it is a high cost operation, and P2P streams cannot be monitored and identified effectively by current P2P caching solutions with DPI. In addition, because the inspection information of the entire file needs to be stored, DPI requires a huge storage capacity.

Therefore, there is a need for a more effective and lower cost solution to monitor and identify P2P streams.

SUMMARY OF THE INVENTION

According to a first aspect of the present invention, a method of identifying payload of a data packet in a TCP stream is provided. The method includes the steps of: inspecting the TCP stream to obtain a data packet in the TCP stream; calculating a payload signature according to information in header of the data packet in the TCP stream; comparing the payload signature with a pre-stored file signature; and determining the payload of the data packet in the TCP stream as belonging to a file corresponding to the pre-stored file signature, in response to a match between payload signatures of multiple data packets and the pre-stored file signature.

According to a second aspect of the present invention, a device for identifying payload of a data packet in a TCP stream is provided. The device includes: inspection means for inspecting the TCP stream to obtain a data packet in the TCP stream; calculation means for calculating a payload signature according to information in the header of the data packet in the TCP stream; comparison means for comparing the payload signature with a pre-stored file signature; and determining means for determining the payload of the data packet in the TCP stream as belonging to a file corresponding to the pre-stored file signature, in response to a match between payload signatures of multiple data packets and the pre-stored file signature.

According to the present invention, inspection is made to only the header of a data packet in a TCP stream, and the content of TCP payload is identified by using the checksum of the data packet without analyzing the content (that is, payload) of the data packet. Therefore, the present invention has the following advantages:

fast packet inspection and content identification is enabled;
 low costs of implementation, storage and calculation are required; and
 the existing system does not need to be restructured, which facilitates deployment.

In addition, only when a TCP stream is running through an intermediate node, the intermediate node perform calculation according to information in the header of a data packet and thus obtains a payload signature. Therefore, no modification is needed for the existing TCP/IP protocol.

BRIEF DESCRIPTION ON THE DRAWINGS

Figure 2:
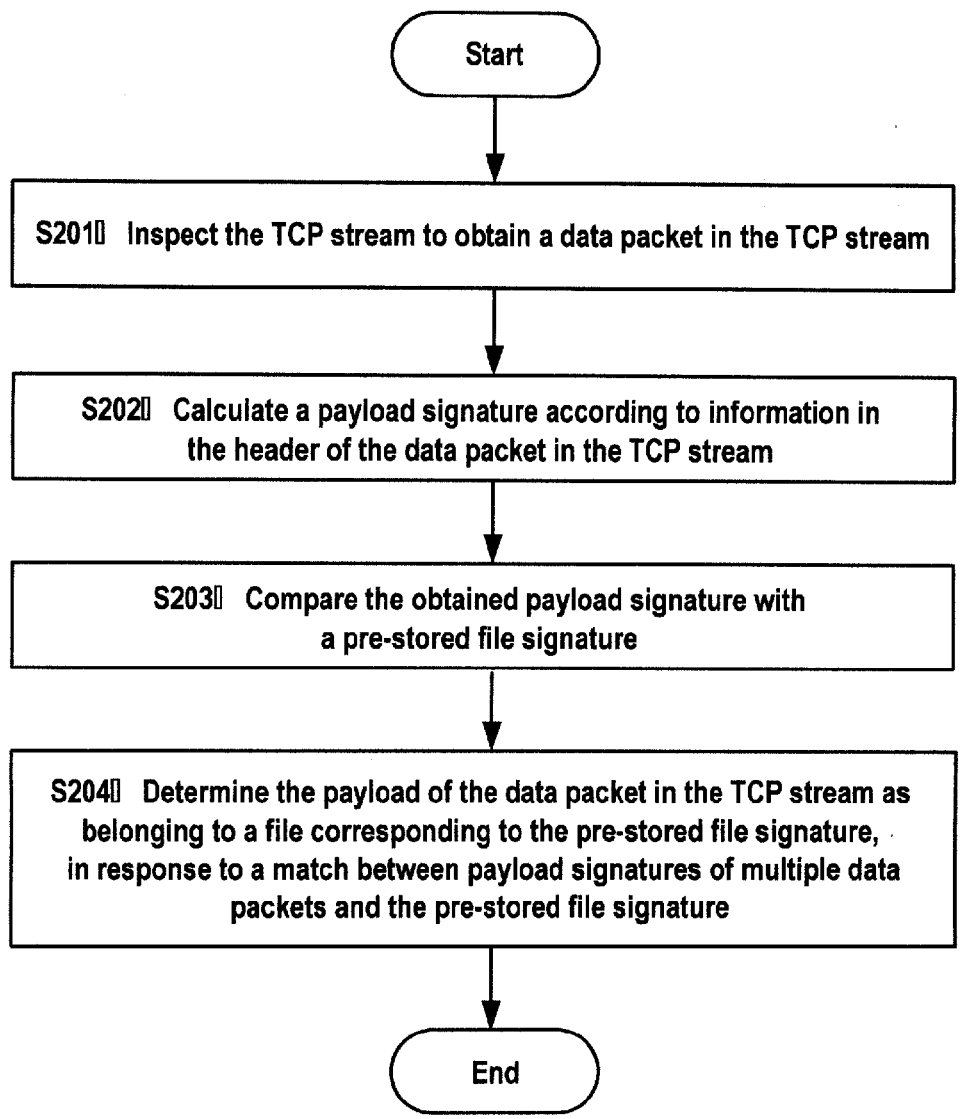
Figure 3:
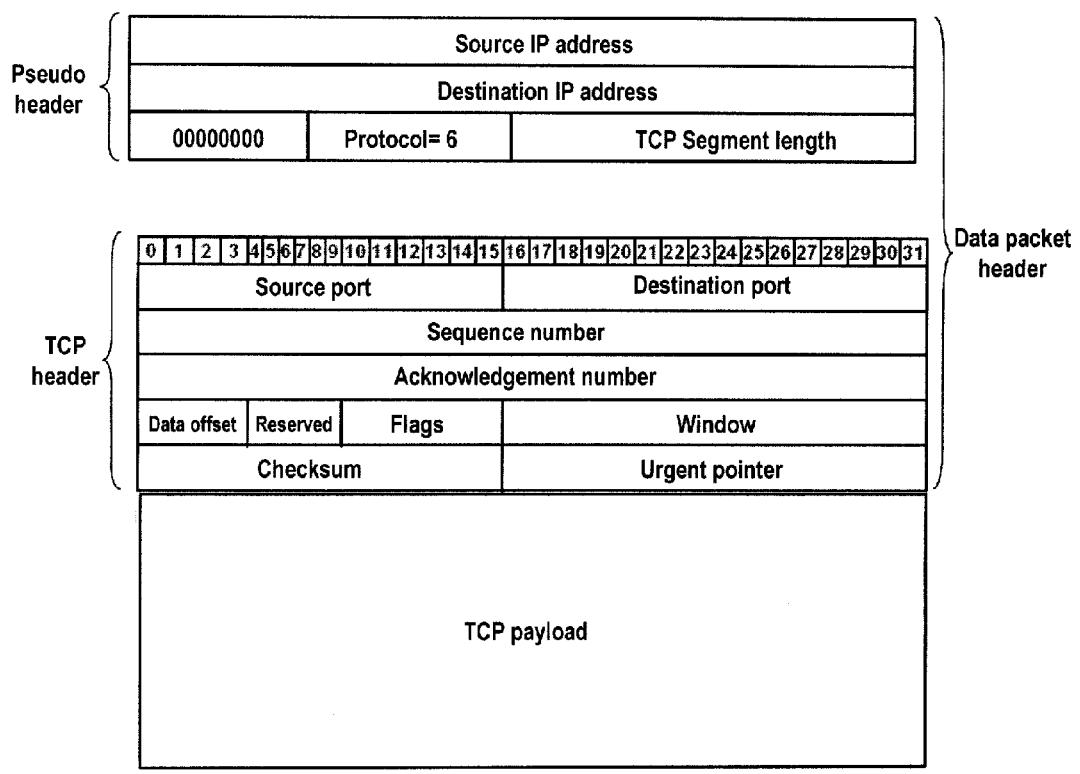
Figure 4:
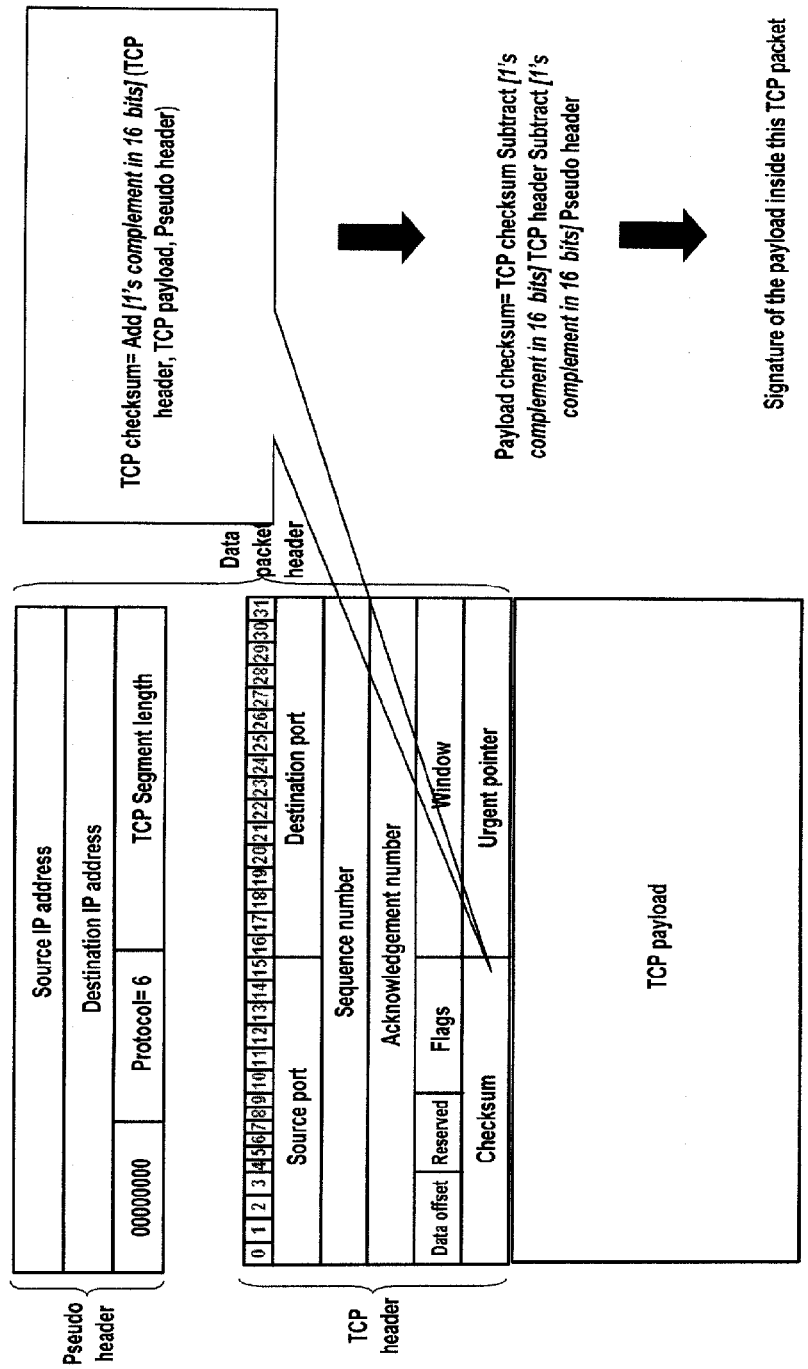
Figure 5:
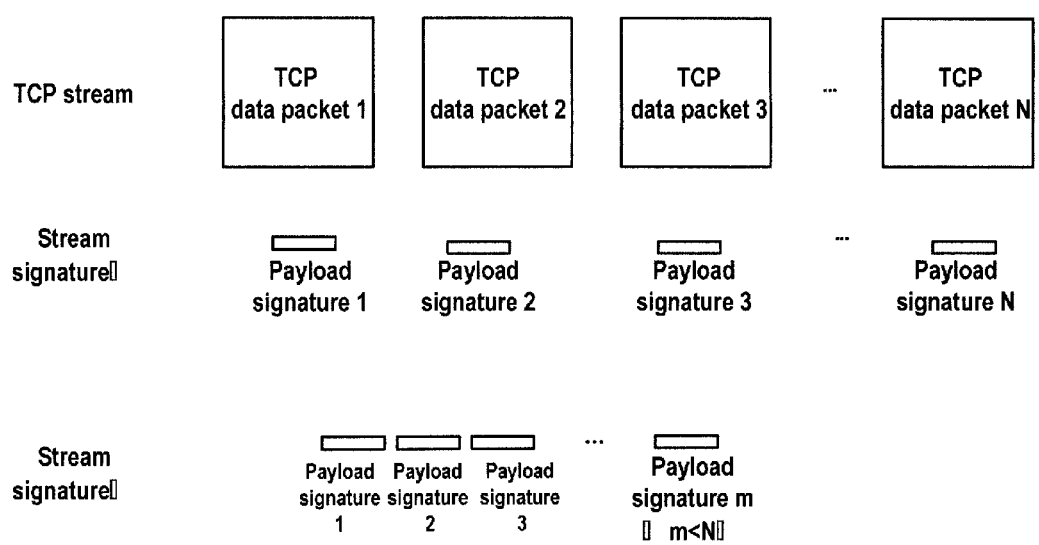
Figure 6:
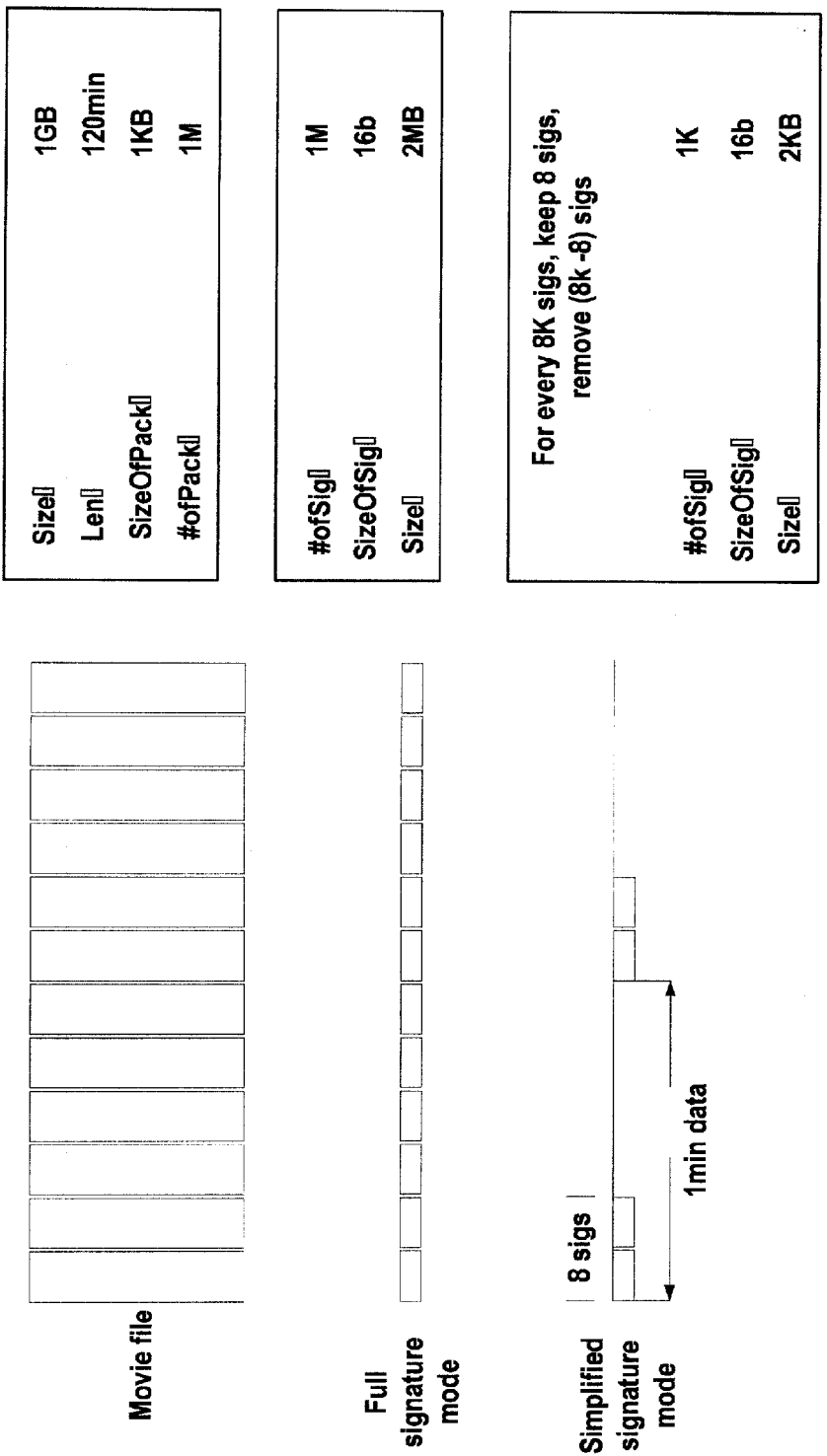
Figure 7:
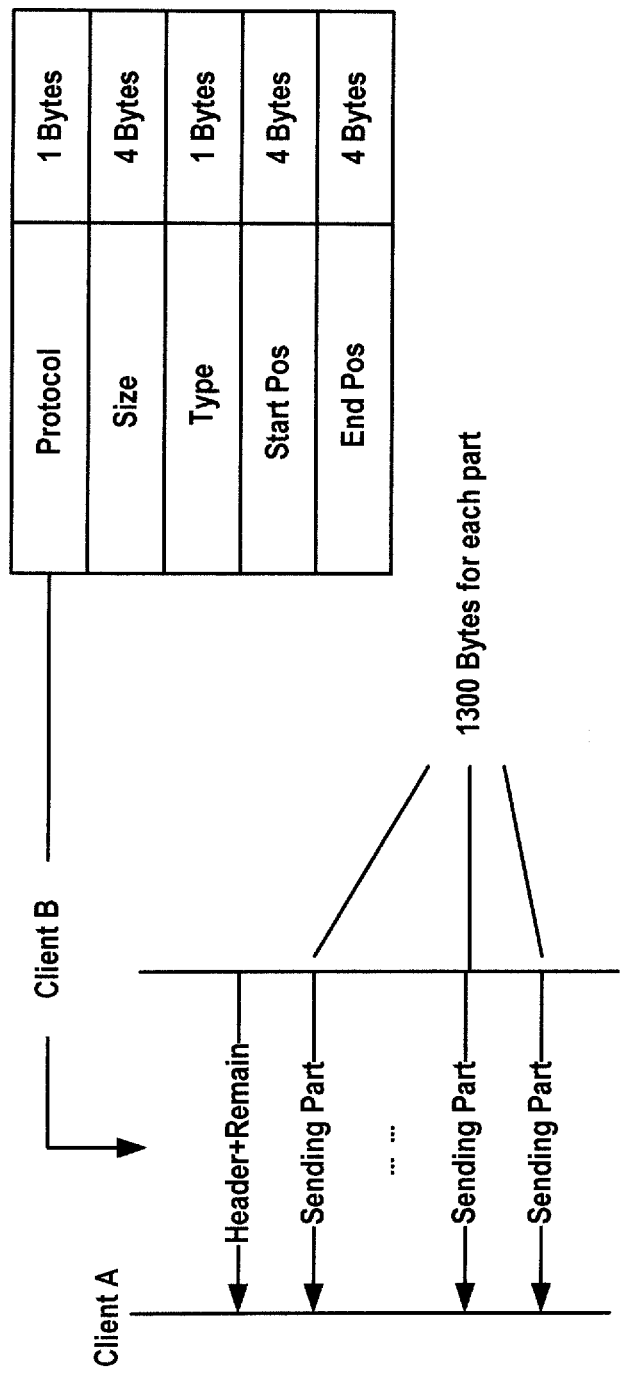
Figure 8:
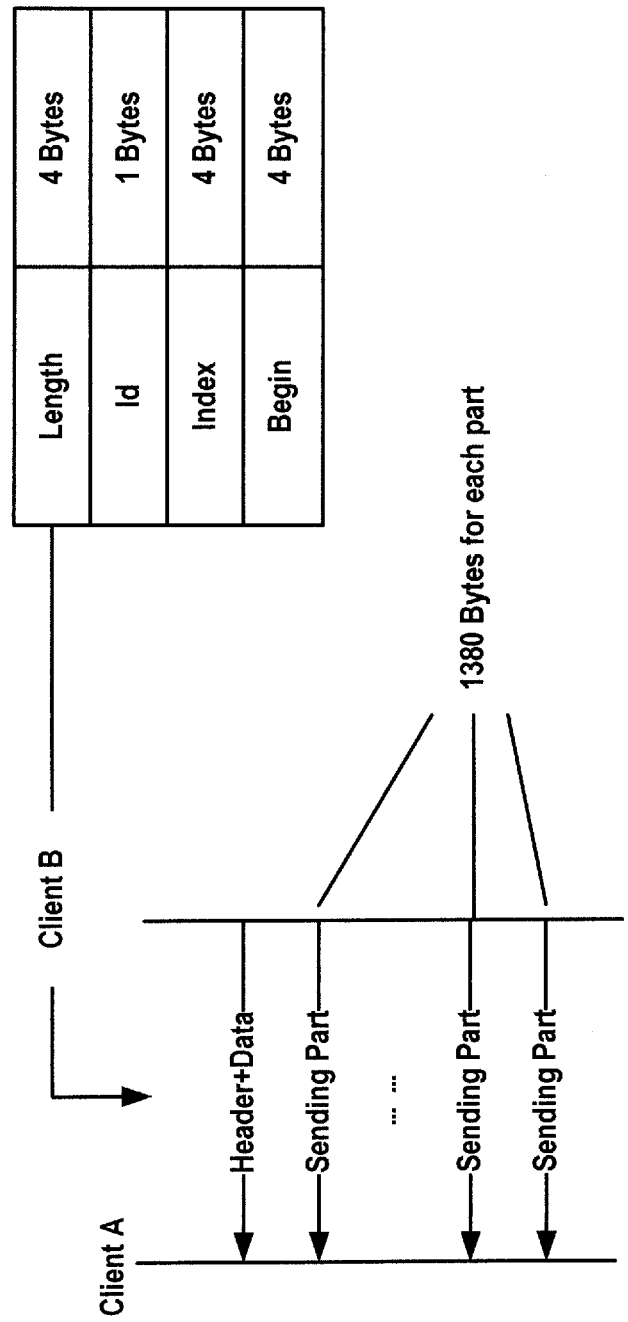
Figure 9:
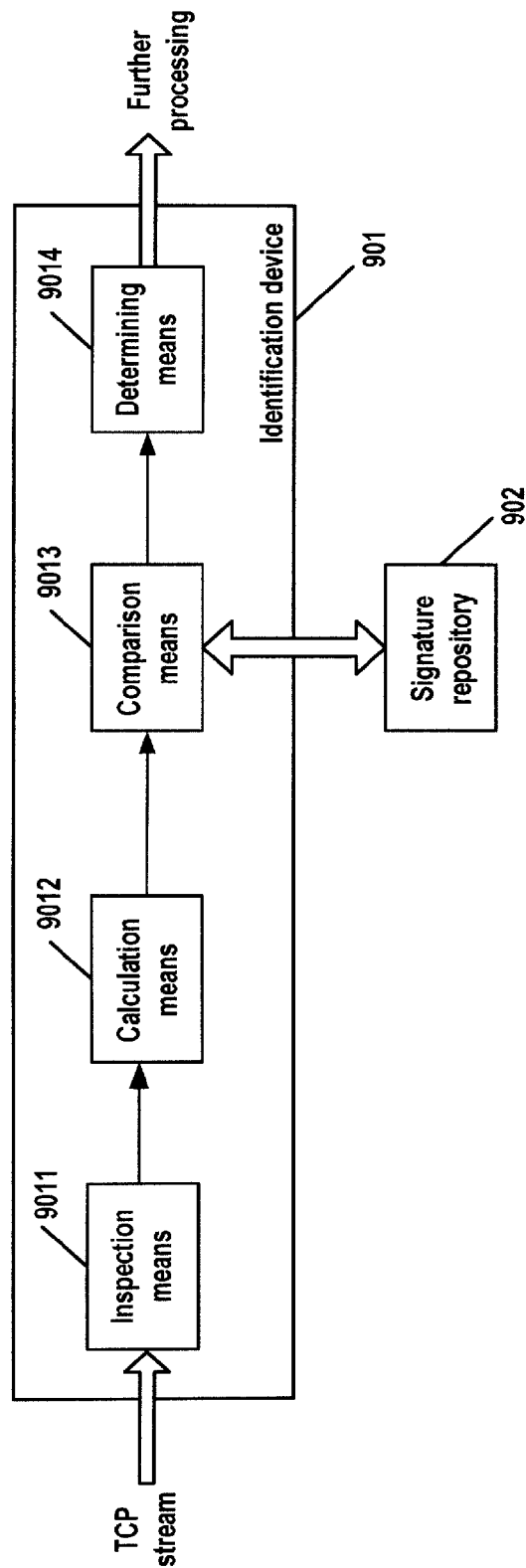
Figure 10:
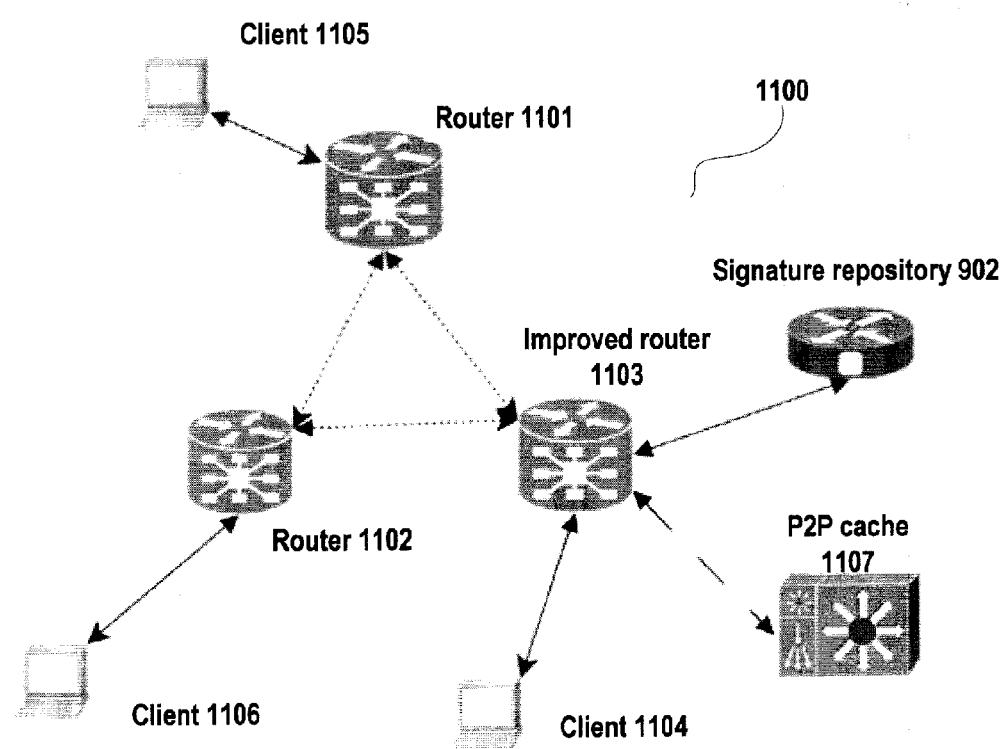

FIG. 1 is a schematic block diagram of a P2P caching system in the prior art.
FIG. 2 is a schematic flowchart of a method according to a general embodiment of the present invention.
FIG. 3 is a schematic view of a TCP data packet.
FIG. 4 is a schematic view illustrating at an algorithm level how to generate a checksum at the transmitter side.
FIG. 5 is a schematic view of an exemplary TCP stream and its payload signatures.
FIG. 6 is a schematic view of two modes for describing payload signatures according to an embodiment of the present invention.
FIG. 7 is a schematic view of eMule, a typical P2P application.
FIG. 8 is a schematic view of BT (BitTorrent), another typical P2P application.
FIG. 9 is a schematic block diagram of a device according to the present invention.
FIG. 10 is a schematic block diagram of a system according to an embodiment of the present invention.

DETAILED DESCRIPTION OF THE PREFERRED EMBODIMENTS

A detailed description is given below to the present invention in terms of the preferred embodiments. Objects, features, applications, and advantages of the present invention will become apparent from the detailed description of embodiments of the present invention, when taken in conjunction with the figures wherein like reference numerals represent the same or corresponding components or steps.

With the massive use of P2P, P2P traffic has become the principle traffic in metropolitan area networks, a large portion of which is download and video service. Due to the symmetric characteristic of P2P and the increase of P2P traffic ratio, the metropolitan area network traffic model is gradually shifting from an asymmetric model to a symmetric model, and P2P streaming is in disorder. Monitoring data of traffic in a certain metropolitan area network shows that P2P traffic streaming out of this metropolitan area network accounts for more than 60% of the entire network traffic.

The present invention is explained below in the context of P2P downloading of a movie. For example, a number of users simultaneously download a smash-hit movie by means of P2P software such as eMule or BT in a certain district of a city or even a large residential community. Hence, massive P2P traffic between these users might affect the normal operation of conventional telecommunication-level service or even cause network congestion during peak hours, 20:00-24:00 for example. If the operator can effectively inspect such relatively concentrated P2P traffic and deploy in the relevant district or community a proper storage device such as a P2P cache via which users within the district or community can download the movie. Then, massive P2P traffic will be limited within the district or community and pressure on the entire network be alleviated effectively. In addition, this will become a new profit increase for the operator if being developed and deployed as a new service.

In fact, download and video service causes astonishing P2P traffic due to their overwhelming advantages in P2P traffic. Therefore, if the operator can guide this trend to a reasonable place and make use of it, it is of enormous benefit to reducing pressure on networks, increasing the quality of service, optimizing types of service and yielding more profits.

Operators may adopt various approaches to guide and utilize P2P streams. Still, take a smash-hit movie for example. The operator may learn in advance which smash-hit movies are on, acquire corresponding movie files with the copyright license and store them in a proper storage device such as a P2P cache. When a P2P flows through, inspection is made as to content, which is being transferred over the P2P stream; if the content being transferred over the P2P stream is a certain smash-hit movie, this movie is provided to users directly from the storage device. For the purpose of such inspection, the present invention proposes a method and device of identifying the payload of a data packet in a TCP stream.

FIG. 2 is a schematic flowchart of a method according to a general embodiment of the present invention. When a P2P stream flows through an intermediate node, the intermediate node inspects content of the P2P stream according to steps shown in FIG. 2.

In step S201, inspection is made to a TCP stream for obtaining a data packet in the TCP stream.

In step S202, a payload signature of the data packet is calculated according to information in the data packet header in the TCP stream, which is explained in detail below.

First, a brief description is given to a TCP data packet.

FIG. 3 is a schematic view of a TCP data packet. As the structure of the TCP data packet is well known in the art, only pseudo header and TCP header portions of the data packet header, which are closely related to the present invention, are shown in FIG. 3, and other portions of the data packet header are omitted. However, it is to be understood that the actual data packet header may further include other fields. In the prior art such as DPI, content of the payload must be analyzed during inspection of a TCP data packet. In the present invention, however, only the data packet header is inspected, and content of the payload is identified by using the checksum in the TCP header without analyzing content (that is, payload) of the data packet. That is, the solution of the present invention only involves the pseudo header and the TCP header in FIG. 3, especially the checksum field in the TCP header.

According to the TCP protocol, the checksum in the TCP header is generated in the following manner. That is, the complement of fields of the pseudo header, the payload and the TCP header are added in the unit of 16 bits, which results in value A; value A is bitwise-negated and then added to 1. A 16-bit value obtained as such is then populated in the checksum field, and the data packet is sent out subsequently.

The generation of the checksum is described below at the algorithm level. FIG. 4 is a schematic view illustrating at the algorithm level how to generate the checksum at the transmitter side. The TCP's 16-bit checksum is contained in a field of the TCP header. At the transmitter side, the checksum is generated in a manner as shown in FIG. 4. The TCP's checksum field is set 0 initially. The complement of fields contained in the TCP header, the TCP payload, and the pseudo header are added according to a 16-bit width, that is, the complement thereof are added in the unit of 16 bits or the complement of every 16 bits are added. The value obtained as such is called value A.

For example, assume value A is a 16-bit binary number 1001 1101 0101 0100. Value A is bitwise-negated and added to 1, that is, 1001 1101 0101 0100→0110 0010 1010 1011 (bitwise-negated)→0110 0010 1010 1100 (added to 1). Then, the 16-bit value 0110 0010 1010 1100 obtained as such is populated in the checksum field, and the data packet is sent out.

Description is given next to how to calculate a payload signature according to the checksum in the TCP data packet. As header fields, pseudo fields, and the payload in the TCP data packet will affect the checksum, the value remaining from subtracting the "effect" or contribution of other TCP header fields and pseudo header fields is the sum of payloads and is used as a payload signature. Hence, it is possible to calculate the payload signature for each data packet simply and quickly.

In detail, after the TCP data packet is intercepted, the checksum in the TCP header has 1 subtracted from itself and is bitwise-negated subsequently. Hence, value A is obtained. The complement of fields except the checksum in the TCP header and fields in the pseudo header are added in the unit of 16 bits. Thus, value B is obtained. Then, value B is bitwise-negated and is added to 1. Value B' is obtained accordingly. The result from adding value A and value B' is used as a payload signature.

Description is given below to a calculation method for the payload signature at the algorithm-level. The TCP header (including the checksum field) and the pseudo header are both known at the intermediate node, for example on a router or a switch. In order to calculate a payload signature, the "effect" or contribution (called value B) of other TCP header fields and pseudo header fields needs to be subtracted from value A. The remaining value is then the calculated sum of payloads and is used as a payload signature. That is, it is necessary to calculate A−B.

To this end, operation is performed according to the following procedure. The complement of fields except the checksum in the TCP header are first added according to a 16-bit width, and then added to the complement of fields in the pseudo header according to 16 bits; the value obtained as such is value B. Value B is bitwise-negated and is then added to 1. Hence value B' is obtained. If the checksum has 1 subtracted from itself and is subsequently bitwise-negated, it is then restored to value A. A payload signature is then obtained by adding value A and value B'. It should be noted that such a nature is used that A−B=A+(B bitwise-negated and added to 1).

For example,

| | |
|---|---|
| A = | 0110 0010 1010 1100 (binary) |
| B = | 1101 0110 1011 0101 (binary) |
| B bitwise-negated = | 0010 1001 0100 1010 (binary) |
| B bitwise-negated and added to 1 = | 0010 1001 0100 1011 (binary) |
| A − B = | 1000 1011 1111 0111 (binary) |
| A + B (bitwise-negated and added to 1) = | 1000 1011 1111 0111 (binary) |

In the present invention, A is the sum of fields contained in the TCP header (excluding the checksum), the TCP payload, and the pseudo header; B is the sum of the pseudo header and the TCP header excluding the checksum.

It can be thus ensured by using the intrinsic commutative law and associative law of an algorithm that the calculation result of a payload signature is definite.

It is to be understood that a pre-stored file signature corresponds to the payload signature generated during inspection. That is, the signature is generated during inspection in the same way as the signature being pre-stored. FIG. 4 only shows an example of how to generate a checksum. If the checksum is generated in another way, then the algorithm for the pre-stored file signature and the payload generated during inspection varies accordingly.

Further, those skilled in the art may not utilize the above checksum but utilize other algorithms, such as a conventional Hash algorithm or a Hash algorithm to be developed in future, for generating a payload signature. In this case, for example, a Hash algorithm is first applied to payload to generate information corresponding to the payload content at the transmitter side, and the information is then sent out along with the TCP data packet by being incorporated to the TCP header or in other ways. Accordingly, a signature corresponding to the payload needs to be generated according to the same Hash algorithm and is stored in a signature repository. During inspection of the TCP stream content, a payload signature is calculated according to the above intercepted information in the TCP packet, and the calculated payload signature is compared with a file signature pre-stored in the signature repository.

Further, those skilled in the art may make various alternations and optimization to the method of generating a payload signature of the present invention according to circumstances. For example, a signature obtained by using the checksum and/or other Hash algorithms is added to a required constant, and the sum is then used as the payload signature of the present invention. Each signature obtained by using the checksum and/or other Hash algorithm is multiplied by a corresponding weight, and the product of multiplication is then used as the payload signature of the present invention. Those skilled in the art may conceive many calculation methods for a payload signature based on the present invention.

FIG. 5 is a schematic view of an exemplary TCP stream and its payload signature. In the example shown in FIG. 4, the TCP stream is a P2P stream whose content is a 1 GB video file that is divided into 1, 2, 3, . . . , N TCP data packets each having a size of 1M.

For example, a payload signature in a size of 2 B, that is, 16 bits, may be calculated for each TCP data packet in the TCP stream. Payload signatures of all TCP data packets in the TCP stream form the TCP stream's payload signature, which is called a stream signature. This case is as shown by stream signature I in FIG. 4.

It is to be understood that the term "stream signature" is a concept introduced for the purpose of convenient designation and is just a general name for payload signatures of selected TCP data packets in a TCP stream. However, it is by no means meant that the solution of the present invention must include additional steps of generating a "stream signature," so long as required payload signatures of multiple TCP data packets in the TCP stream can be calculated.

The payload signature is a label for identifying payload, and the same payload signature means the same payload. As described above, the payload signature is a 16-bit binary number, and the same payload signature means equal 16-bit binary number. However, there are still occasions in which payload cannot be identified correctly. As is clear from the calculation, the miss probability of the payload signature for a single TCP data packet is 10%, that is, $10^{-1}$. However, there is a high probability of correctly identifying content of a stream by consecutive payload signatures, that is, a stream signature.

For example, there is a 2 B payload signature for each TCP data packet, and then it is impossible to derive from calculation that there is a probability of $\frac{1}{2}^{16}$ for different data packets to have the same checksum. Hence, for a 16 B stream signature (that is, the stream signature includes payload signatures of only eight TCP data packets in the TCP stream), the probability for different TCP streams to have the same 16 B payload signature will be very rare: $\frac{1}{2}^{128}$. If a 32 B stream signature (that is, the stream signature includes payload signatures of 16 TCP data packets in the TCP stream), 64 B stream signature (that is, the stream signature includes payload signatures of 32 TCP data packets in the TCP stream) or stream signature with a larger number of bytes is chosen as the stream signature, there will then be even higher accuracy (i.e. the probability of mistaking the TCP stream of one movie file as the TCP stream of another movie file is lower).

Returning to FIG. 2, in step S203, the payload signature obtained in step S202 is compared with the pre-stored file signature.

For example, the signature of a file may be generated through the step of dividing in advance the file into multiple portions of a specific length, wherein one of the portions of a specific length can be transmitted in a data packet. A signature is generated for each of at least part of the portions of a specific length by using the same approach as for generating the payload signature in step S202.

The file can be divided according to different protocols. For example, the file may be divided into multiple 1300-byte portions with respect to eMule, or the file may be divided into multiple 1380-byte portions with respect to BT.

For example, FIG. 7 is a schematic view of eMule, a typical P2P application. In Emule, each file is divided into multiple 9.28 MB portions, and each portion is divided into multiple 180 KB blocks. The downloading client may download a portion of the file from any source and download all blocks of the portion from this source, at a given moment. During transmission, the 180 KB block is divided into 1300 bytes. One 1300-byte portion is transmitted in each TCP data packet. Then, the method shown in FIG. 6 is applied to these TCP data packets. The article "The eMule Protocol Specification" published by Yoram Kulbak and Danny Bickson in *The Hebrew University of Jerusalem* on Jan. 17, 2005 describes eMule in detail, the disclosure of which is incorporated here for reference.

FIG. 8 is a schematic view of BT, another typical P2P application. In BT, each file is divided into equal-sized pieces. During transmission, the equal-sized piece is further divided into 1380-byte portions according to the network MTU (Maximum Transmission Unit). Then, one 1380-byte portion is transmitted in each TCP data packet. The method shown in FIG. 6 is applied to these TCP packets subsequently. The article "The BitTorrent Specification" at the web page http://wiki.theory.org/BitTorrentSpecification (2006) describes BT in detail, the disclosure of which is incorporated here for reference.

Signatures of a file may be stored as a signature list, which is a list of payload signatures during transmitting the file in a TCP stream. The list may be generated before transmission of the file or generated according to the calculation of step S202. It is further to be understood that the signature list is merely an example of storage of payload signatures. Payload signatures may be stored in other fashions according to circumstances. However, the implementation of the present invention will not be affected regardless of the fashion in which payload signatures are stored.

The signature list of a file may store all payload signatures (hereinafter referred to as a full signature mode) or store only part of payload signatures (hereinafter referred to as a simplified signature mode).

FIG. 6 is a schematic view of two modes for describing payload signatures according to an exemplary embodiment. FIG. 6 illustrates how to calculate payload signatures of a movie file with a size of 1 GB and for a duration of 120 minutes. Assuming the 1 GB movie file is divided into 1 KB TCP data packets for transfer, then there will be 1M TCP data packets for this movie file. Illustration is given below to the full signature mode and the simplified signature mode by referring to FIG. 6.

The full signature mode is described first. As described above, there will be 1M payload signatures for 1M TCP data packets. Considering that the size of each payload signature is 16 bits and all the data packets are used for calculating a stream signature (refer to stream signature I in FIG. 5), the size of payload signatures (or the stream signature) of the movie file is only 2 MB. Apparently a 2 MB signature list is not a big size for a 1 GB movie file.

The simplified signature mode (refer to stream signature II in FIG. 5) is described next. The simplified signature mode is a more storage space-efficient signature generation approach compared to the full signature mode. For example, for every 8K signatures, only eight signatures are stored, whereas other 8K−8 signatures are not stored. That is to say, a storage space of (8k−8) signatures is saved. For purpose of convenient calculation, the first eight signatures of 8K signatures are selected. Hence, in the simplified signature mode, the signature list contains payload signatures of the first to eighth, $8K^{th}$ to $(8K+8)^{th}$, ... $8nK^{th}$ to $(8nK+8)^{th}$ data packets. With this mode, the number of signatures in the signature list will only be 1K for this 1 GB movie file. Given the size of each signature is 16 b, the size of the signature list (or stream signature) of the movie file will only be 2 KB. So, only a 2 KB size signature is needed for each 1 GB movie file, which is obviously a loose requirement for intermediate nodes like routers. In this way, a router with 2 GB memory can accommodate signature lists of about 1M movie files.

Therefore, operators, content providers or other bodies may decide whether to choose the full signature mode or the simplified signature mode, according to circumstances. For the simplified signature mode, the size of a stream signature may be chosen according to circumstances and the accuracy to be achieved. As is clear from the foregoing description, high accuracy can be achieved by storing only eight signatures for every 8K signatures. Such accuracy is sufficient to practical applications. Apparently the solution of the present invention not only significantly saves the storage space of intermediate nodes like routers but also requires a small calculation load.

It is to be understood that selecting eight consecutive signatures for 8K signatures serves as an example merely. The number of 8K is selected based on the example of FIG. 6, in which a 1 G movie lasts for 120 minutes. So the number of data packets covered by a one-minute duration is 1M/120=8333, or is approximately 8K. The number of consecutive signatures, which are selected out of every segment of signatures, is related to the identification accuracy required by a user. For example, if a user requires identification accuracy of D, the number of consecutive signatures being stored is N, and the false decision rate of each signature is e, then N is selected to meet $1/e^N<D$.

If the signature list is in the full signature mode, then a TCP stream may be intercepted at any moment, and signature payload is calculated in step S202. Then the payload signature can be compared with the signature list at any moment of step S203, and a correct result will still be obtained.

If the signature list is in the simplified signature mode, then the P2P stream is scanned at intervals, for example, every one minute, so as to intercept a TCP stream. In step S202, payload signatures of data packets in the intercepted TCP stream, which are selected according to a sampling frequency of the simplified signature mode, are calculated. For example, if the simplified signature mode adopts a frequency of sampling the first eight signatures out of every 8K signatures, then payload signatures of the first to eighth, $8K^{th}$ to $(8K+8)^{th}$, ... $8nK^{th}$ to $(8nK+8)^{th}$ data packets in the TCP stream are calculated. By scanning the TCP stream every one minute, it is possible to judge whether or not the intercepted TCP data packets include the first to eighth, $8K^{th}$ to $(8K+8)^{th}$, ... $8nK^{th}$ to $(8nk+8)^{th}$ data packets in the data stream. If yes, the flow then proceeds to steps S202 and S203. If not, then the flow waits for the next scanning.

In step S204, it is determined whether content of data packet payload in the TCP stream is a file corresponding to the pre-stored file signature, in response to a match between payload signatures of one or more data packets and the pre-stored file signature. Here, "match" means that the payload signature of a data packet is the same as a pre-stored file signature.

It is to be understood that it is possible to determine a corresponding file according to the payload signature in case of a small file or not high identification accuracy. For a large file or high identification accuracy, it is better to adopt the match of several consecutive payload signatures, that is, stream signature, to determine a file.

The content of data packet payload in the TCP stream as determined in step S204 is the specific file, the smash-hit movie for example. Then the subsequent processing flow is completely the same as in the P2P caching system in the prior art. That is, at this point, a router 1103 will transparently direct P2P traffic to a P2P cache 1107. P2P cache 1107 either provides file services to a client 1104 directly or passes the request on to a remote P2P user 1105 and simultaneously caches that data for the next user 1106.

It is to be understood that the payload signature of the movie file may be generated in advance according to the method shown in FIG. 2 and is pre-stored in a signature repository 902 (refer to FIGS. 9 and 10) for use in step S203. As described above, payloads of the movie file may be stored as a signature list in which one movie file corresponds to an item of the signature list. One identical movie might have multiple movie file versions. Then one item may be stored for each version. To save costs, however, a more proper practice is to store one item for each of several main versions. As long as the same movie has different movie file versions, it should be treated as different files.

FIG. 9 is a schematic block diagram of a device according to the present invention. As shown in this figure, an identification device 901 includes inspection means 9011, calculation means 9012, comparison means 9013, and determining means 9014. Identification device 901 may be located at a router, a switch, or other intermediate node.

According to an embodiment (refer to FIG. 10) of the present invention, client 1104 already establishes a P2P connection with client 1105 via routers 1101 and 1103 and exchanges files. In this case, inspection means 9011 inspects the TCP stream so as to obtain data packets in the TCP stream. For example, inspection means 9011 scans the TCP stream between client 1104 and client 1105 at intervals, every minute for example.

Calculation means 9012 calculate the payload signature of the data packet according to information in the data packet (refer to FIGS. 3 and 4) header in the scanned TCP stream. Then, comparison means 9013 compares the payload signature obtained by calculation means 9012 with a pre-stored file signature (for example, stored in signature repository 902 shown in FIGS. 9 and 10). Afterwards, in response to a match between payload signatures of data packets and the pre-stored file signatures, determining means 9014 determines that content of the payload of the data packets in the TCP stream belongs to a file corresponding to the pre-stored file signature.

In view of the result determined by determining means 9014, operators, content providers, or other bodies may further process the TCP stream according to circumstances. Similar to the prior art, the network may transparently direct P2P traffic to P2P cache 1107 in response to identification device 901 identifying that content of the payload of the data packets in the TCP stream belongs to a file corresponding to the pre-stored file signature. P2P cache 1107 either provides file services to client 104 directly or passes the request on to a remote P2P user (for example, client 1105) and simultaneously caches that data for the next user (for example, client 1106). In addition, the determination result may be used for traffic-limiting P2P users, for preventing malicious software from being propagated, for copyright protection, and so on.

According to a preferred embodiment of the present invention, comparison means 9013 communicates with signature repository 902 to compare payload signatures with file signatures pre-stored in signature repository 902. Taking a movie file for example, in signature repository 902, one movie file corresponds to one item of the signature list. One identical movie might have multiple movie file versions. Then one item may be stored for each version. To save costs, however, a more proper practice is to store one item for each of several main versions. As long as the same movie has different movie file versions, it should be treated as different files. Note although signature repository 902 is located outside identification device 901 as shown in FIG. 9, it may be located inside identification device 901 according to circumstances.

According to a preferred embodiment of the present invention, information in data packet header for calculating a payload signature includes a TCP header and a pseudo header.

According to a further embodiment of the present invention, the TCP header includes a checksum and generates the checksum based on fields in the TCP header, payload, and pseudo header.

According to a further embodiment of the present invention, calculation means 9012 removes portions of the checksum, which correspond to the TCP header and pseudo header, from the checksum and obtains a payload signature as such.

According to another embodiment of the present invention, calculation means 9012 subtracts 1 from the checksum in the TCP header and obtains value A subsequent to bitwise negation. The complement of fields except the checksum in the TCP header and fields in the pseudo header are added in the unit of 16 bits, which results in value B. Value B is then bit-wise negated and added to 1, which results in value B'. Value A and value B' are subsequently added, the result from which is used as a payload signature.

According to a preferred embodiment of the present invention, identification device 901 may include means for dividing in advance the file into portions of a specific length, one of which can be transmitted in a data packet. Identification device 901 may further include means for generating a file signature for at least one part of the portions of a specific length, wherein signatures for at least one part of the portions of a specific length are generated in the same way as for calculating a payload signature according to information in data packet header in the TCP stream as described with reference to FIG. 6. As discussed above, signature repository 902 of identification device 901 is for storing the signatures generated for at least one part of the portions of a specific length.

It is to be understood that signature repository 902 serves as merely an example of means for storing the signatures for at least one part of the portions of a specific length. Other storage means may be used to store payload signatures according to circumstances. No matter which storage means are used for storing payload signatures, no impact will be exerted on the implementation of the present invention.

Note respective means of identification device 901 may be located at the same entity device or different entity devices, according to circumstances.

FIG. 10 is a schematic block diagram of a system according to an embodiment of the present invention. A system 1100 shown in FIG. 10 adopts the method according to the present invention. Routers 1101 and 1102 are routers in the prior art, and a router 1103 is an improved router. Improved router 1103 includes identification device 901 (not shown in FIG. 10) as shown in FIG. 9. Clients 1104-1106 and P2P cache 1107 may be known in the prior art. The signature repository in FIG. 10 is the same as signature repository 902 in FIG. 9.

Note both FIGS. 1 and 10 are merely illustrative, and an actual system may include more devices. For example, FIG. 10 only shows three routers and three clients for the purpose of simplicity. In fact, the system may include more routers, one router may be connected to more clients, and there may be more improved routers. It is to be understood that although the signature repository is shown to be located at a device separate from the improved router in FIG. 10, it may actually be located at the improved router.

Further, although the device according to the present invention is shown to be located at a router in FIG. 10, it may be located at a switch, any intermediate node, or even a client. Likewise, the signature repository may be located at any intermediate node or even a certain client or a P2P cache.

As is clear from comparison between FIG. 1 and FIG. 10, the technical solution of the present invention can be implemented by making simple upgrade to a few existing devices.

It is to be understood that although the present invention has been described in the context of a P2P application, it is not limited thereto but applies to various applications in which a single file is divided into multiple identical portions. In addition, although the present invention is described to be used in conjunction with P2P caching, it is not limited thereto. After the inspection according to the present invention, how to use the inspection result may be determined according to circumstances. Further, although the device of the present invention is preferably deployed by operators, such deployment may be performed by different bodies dependent upon concrete network environments and management regulations. Moreover, although the present invention has been described by taking a movie file as an example, it is not limited thereto but applies to a diversity of file content.

The present invention may be implemented in full hardware, full software, hardware or a combination thereof. In preferred embodiments of the present invention, the present invention is implemented in software, which includes, without limitation to, firmware, resident software, microcode and so on.

In addition, the present invention may be in a form of a computer program product accessible from computer usable or readable medium, the medium providing program code to be used by a computer or any instruction executing system or to be used in conjunction with a computer or any instruction executing system. For the purpose of description, the computer usable or readable medium may be any feasible means that may contain, store, transfer, propagate or transmit a program to be used by a computer or any instruction executing system or to be used in conjunction with a computer or any instruction executing system.

In the foregoing detailed description, reference is made to the figures which form a part of the description, wherein specific embodiments capable of implementing the present invention are illustrated. These embodiments and their variations have been described in detail so that those of ordinary skill in the art can implement the present invention. It is to be understood that other proper embodiments may be adopted and logical, mechanical and electrical alternations be made without departing from the sprit or scope of the present invention. For example, functional blocks shown in the figures may be combined or separated in any manner without departing from the essence or scope of the present invention. To avoid some unnecessary details, some information that is well known to those of ordinary skill in the art is omitted in this specification. Therefore, the foregoing detailed illustration is not intended to limit the present invention to specific embodiments presented here. On the contrary, the invention is intended to cover various alterations, modifications and equivalence included within the spirit and scope of the appended claims.

What is claimed is:

1. A method of identifying payload of a data packet in a TCP stream, comprising:
   inspecting the TCP stream to obtain the data packet in the TCP stream;
   calculating a payload signature according to information in a header of the data packet in the TCP stream, the header comprising a TCP header and a pseudo header, wherein the TCP header comprises a checksum, wherein the checksum is generated based on fields in the TCP header, the payload, and the pseudo header;
   wherein calculating the payload signature comprises removing from the checksum portions of the checksum which correspond to the TCP header and the pseudo header, and obtaining the payload signature;
   wherein removing from the checksum portions of the checksum which correspond to the TCP header and the pseudo header further comprises bitwise-negating the checksum subsequent to subtracting 1 therefrom, obtaining value A, obtaining value B by adding complement of fields except the checksum in the TCP header and of fields in the pseudo header in the unit of 16 bits, adding 1 to value B subsequent to bitwise-negating value B, obtaining resultant value B', and adding value A and value B';
   comparing the payload signature with a pre-stored file signature; and
   determining the payload of the data packet in the TCP stream as belonging to a file corresponding to the pre-stored file signature, in response to a match between payload signatures of multiple data packets and the pre-stored file signature.

2. The method according to claim 1, further comprising:
   dividing in advance the file into multiple portions of a specific length, wherein one of the portions of specific length can be transmitted in a data packet and is used as the payload of the data packet;
   generating a file signature for at least one part of the portions of specific length, wherein the file signature for at least one part of the portions of specific length is generated in the same way as calculating a payload signature according to information in the header of the data packet in the TCP stream; and
   storing the file signature generated for the at least one part of the portions of specific length.

3. The method according to claim 1, wherein the TCP stream is a P2P stream.

4. A device of identifying payload of a data packet in a TCP stream, comprising:
   inspection means for inspecting the TCP stream to obtain a data packet in the TCP stream;
   calculation means for calculating a payload signature according to information in header of the data packet in the TCP stream, the header comprising a TCP header and a pseudo header, wherein the TCP header comprises a checksum, wherein the checksum is generated based on fields in the TCP header, the payload, and the pseudo header;
   comparison means for comparing the payload signature with a pre-stored file signature;
   wherein the calculation means removes from the checksum portions of the checksum which correspond to the TCP header and the pseudo header, and obtains the payload signature;
   wherein removing from the checksum portions of the checksum which correspond to the TCP header and the pseudo header further comprises bitwise-negating the checksum subsequent to subtracting 1 therefrom, obtaining value A, obtaining value B by adding complement of fields except the checksum in the TCP header and of fields in the pseudo header in the unit of 16 bits, adding 1 to value B subsequent to bitwise-negating value B, obtaining resultant value B', and adding value A and value B'; and
   determining means for determining the payload of the data packet in the TCP stream as belonging to a file corresponding to the pre-stored file signature, in response to a match between payload signatures of multiple data packets and the pre-stored file signature.

5. The device according to claim 4, further comprising:
   means for dividing in advance the file into multiple portions of a specific length, wherein one of the portions of a specific length can be transmitted in a data packet and is used as the payload of the data packet;
   means for generating a file signature for at least one part of the portions of specific length, wherein the file signature for at least one part of the portions of specific length is generated in the same way as calculating a payload signature according to information in the header of the data packet in the TCP stream; and
   means for storing the file signature generated for the at least one part of the portions of specific length.

6. The device according to claim 4, wherein the device is a router or a switch.

7. The device according to claim 4, wherein the TCP stream is a P2P stream.

* * * * *